United States Patent [19]

Vukovich et al.

[11] Patent Number: 5,038,636
[45] Date of Patent: Aug. 13, 1991

[54] DOUBLE TRANSITION DOWNSHIFT CONTROL FOR AN AUTOMATIC TRANSMISSION

[75] Inventors: William J. Vukovich, Ypsilanti; Melissa M. Koenig, Ann Arbor; Tsunlock A. Yu, Ypsilanti, all of Mich.

[73] Assignee: General Motors Corporation, Detroit, Mich.

[21] Appl. No.: 651,870

[22] Filed: Feb. 7, 1991

[51] Int. Cl.⁵ .................................. B60K 41/18
[52] U.S. Cl. ............................. 74/866; 74/867; 74/868
[58] Field of Search ................ 74/866, 867, 868; 364/424.1

[56] References Cited

U.S. PATENT DOCUMENTS

| | | | |
|---|---|---|---|
| 4,495,576 | 1/1985 | Ito | 74/866 X |
| 4,674,364 | 6/1987 | Shindo et al. | 74/867 |
| 4,690,017 | 9/1987 | Taniguchi et al. | 74/866 |
| 4,700,591 | 10/1987 | Yasue et al. | 74/868 |
| 4,718,310 | 1/1988 | Shindo et al. | 74/867 |
| 4,722,247 | 2/1988 | Shindo et al. | 74/866 |
| 4,744,031 | 5/1988 | Takeda et al. | 74/866 X |
| 4,796,490 | 1/1989 | Butts et al. | 74/866 |
| 4,845,618 | 7/1989 | Narita | 74/866 X |
| 4,967,356 | 10/1990 | Mori | 364/424.1 |

Primary Examiner—Allan D. Herrmann
Assistant Examiner—Daniel Wittels
Attorney, Agent, or Firm—Mark A. Navarre

[57] ABSTRACT

An improved control method for properly coordinating a double transition downshift. The state changes of the various clutches of the transmission are sequenced in relation to a dynamic measure of the transmission speed ratio so as to provide consistent high quality shifting. Adaptive pressure controls are employed in conjunction with the sequencing to compensate for variability.

5 Claims, 8 Drawing Sheets

| GEAR | RATIO | C1 | C2 | C3 | C4 | C5 | OC | RC |
|---|---|---|---|---|---|---|---|---|
| 1st | 3.61 | ON | OFF | OFF | ON | OFF | ON | OFF |
| 2nd | 1.85 | ON | ON | OFF | ON | OFF | ON | OFF |
| 3rd | 1.37 | ON | ON | OFF | ON | ON | OFF | OFF |
| 4th | 1.00 | ON | ON | ON | OFF | OFF | ON | OFF |
| 5th | 0.74 | ON | ON | ON | OFF | ON | OFF | OFF |
| P/N | — | OFF | OFF | OFF | OFF | OFF | ON | OFF |
| R | -2.06 | OFF | OFF | ON | OFF | OFF | ON | ON |

FIG. 1c

| SOLENOID STATES | | | |
|---|---|---|---|
| GEAR | SOLENOID A | SOLENOID B | SOLENOID C |
| 1st | ON | OFF | ON |
| 2nd | OFF | OFF | ON |
| 3rd | OFF | ON | ON |
| 4th | OFF | OFF | OFF |
| 5th | OFF | ON | OFF |

FIG. 6 a
DOUBLE TRANSITION DOWNSHIFT CONTROL FOR AN AUTOMATIC TRANSMISSION

This invention relates to downshift control of a multi-speed ratio automatic transmission, and more particularly, to upshifts involving multiple stage control of the transmission friction elements.

BACKGROUND OF THE INVENTION

Automatic transmissions of the type addressed by this invention include several fluid operated torque transmitting devices, referred to herein as clutches, which are automatically engaged and disengaged according to a predefined pattern to establish different speed ratios between input and output shafts of the transmission. The input shaft is coupled to an internal combustion engine through a fluid coupling, such as a torque converter, and the output shaft is mechanically connected to drive one or more vehicle wheels.

The various speed ratios of the transmission are typically defined in terms of the ratio Ni/No, where Ni is the input shaft speed and No is the output shaft speed. Speed ratios having a relatively high numerical value provide a relatively low output speed and are generally referred to as lower speed ratios; speed ratios having a relatively low numerical value provide a relatively high output speed and are generally referred to as upper speed ratios. Accordingly, shifts from a given speed ratio to a lower speed ratio are referred to as downshifts, while shifts from a given speed ratio to a higher speed ratio are referred to as upshifts.

Shifting from one speed ratio to another generally involves a transition or state change of two clutches. That is, one clutch is engaged (on-coming) while another clutch is disengaged (off-going). The control of this invention applies to a class of shifts involving two sets of state changes These shifts are commonly referred to as double transition shifts. If the state changes involved in double transition shifts are not properly coordinated, the speed ratio may initially change in an unintended direction or at an unintended rate, thereby degrading the shift quality.

SUMMARY OF THE INVENTION

The present invention is directed to an improved control method for properly coordinating a double transition downshift, wherein the state changes of the various clutches are sequenced in relation to a dynamic measure of the transmission speed ratio so as to provide consistent high quality shifting. Adaptive pressure controls are employed in conjunction with the sequencing to compensate for variability.

A double transition upshift control, also disclosed herein, is the subject of a co-pending patent application, U.S. Ser. No. 07/651,888, filed 2/7/91, 1991, also assigned to the assignee of the present invention.

DETAILED DESCRIPTION OF THE INVENTION

Figure 1A:
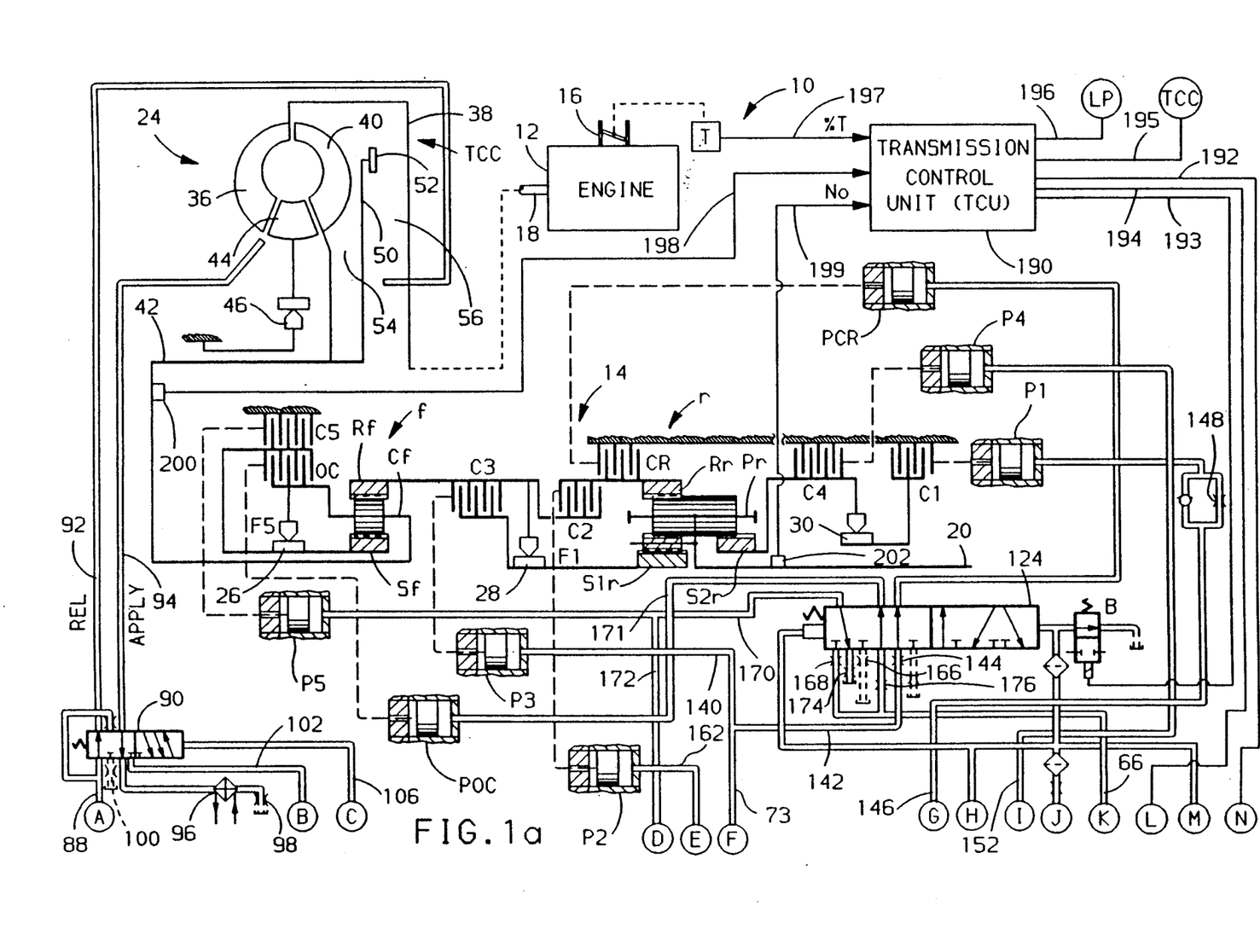
FIGS. 1a-1b form a schematic diagram of a five-speed automatic transmission controlled in accordance with this invention by a computer-based control unit.
Figure 1B:
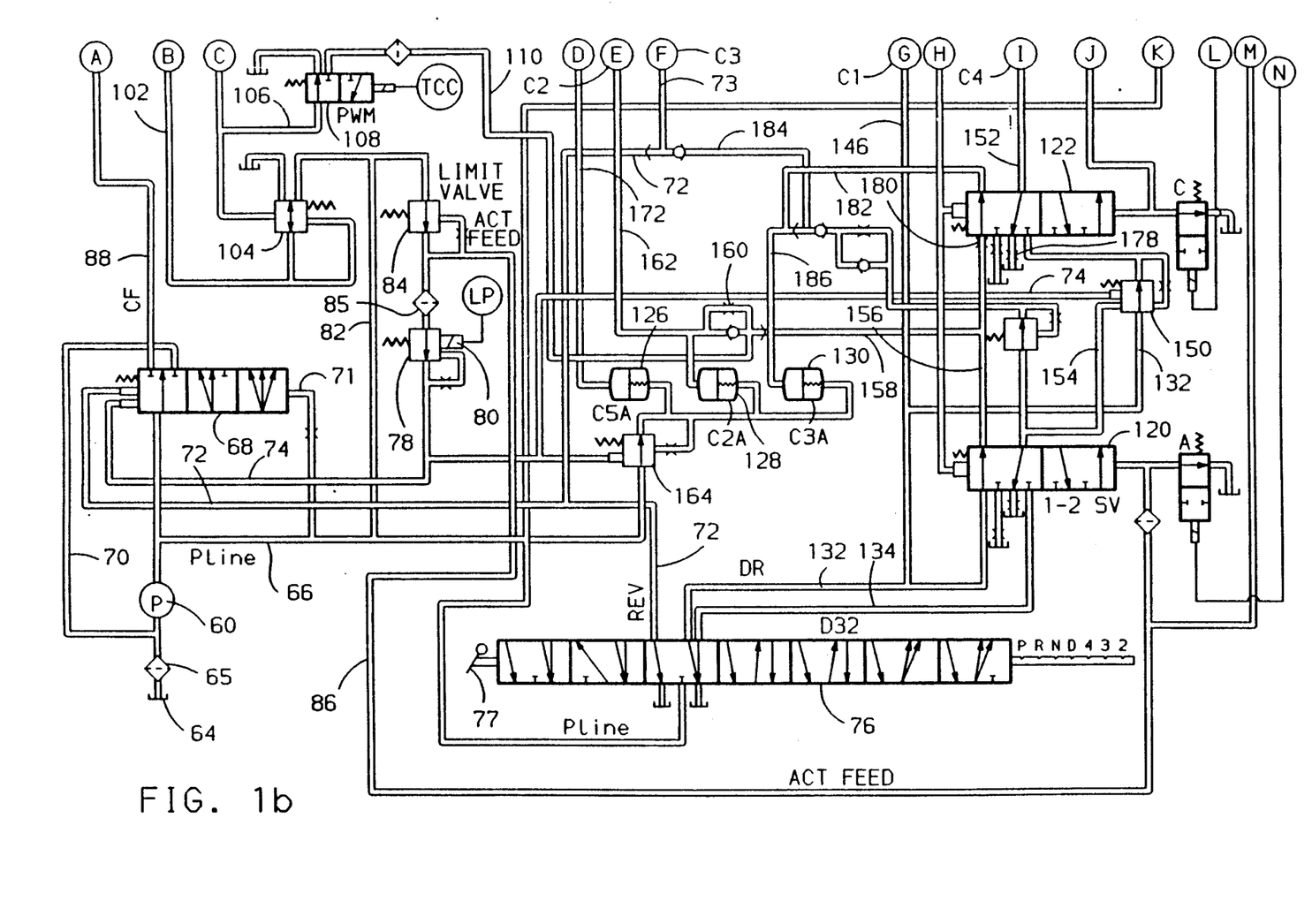

Referring now to FIGS. 1a-1b of the drawings, the reference numeral 10 generally designates a motor vehicle drivetrain including an engine 12 and a planetary transmission 14 having a reverse speed ratio and five forward speed ratios. Engine 12 includes a throttle mechanism 16 mechanically connected to an operator manipulated device, such as an accelerator pedal (not shown), for regulating the air intake of the engine. The engine 12 is fueled by a conventional method in relation to the air intake to produce output torque in proportion thereto. Such torque is applied to the transmission 14 through the engine output shaft 18. The transmission 14, in turn, transmits engine output torque to an output shaft 20 through a torque converter 24 and one or more of the fluid operated clutches C1-C5, OC, Reverse clutch RC, and one-way clutches 26-30, such clutches being applied or released according to a predetermined schedule for establishing a desired transmission speed ratio.

Referring now more particularly to the transmission 14, the impeller or input member 36 of the torque converter 24 is connected to be rotatably driven by the output shaft 18 of engine 12 through the input shell 38. The turbine or output member 40 of the torque converter 24 is rotatably driven by the impeller 36 by means of fluid transfer therebetween and is connected to rotatably drive the turbine shaft 42. A stator member 44 redirects the fluid which couples the impeller 36 to the turbine 40, the stator being connected through a one-way device 46 to the housing of transmission 14.

The torque converter 24 also includes a clutch TCC comprising a clutch plate 50 secured to the turbine shaft 42. The clutch plate 50 has a friction surface 52 formed thereon adaptable to be engaged with the inner surface of the input shell 38 to form a direct mechanical drive between the engine output shaft 18 and the turbine shaft 42. The clutch plate 50 divides the space between input shell 38 and the turbine 40 into two fluid chambers: an apply chamber 54 and a release chamber 56.

When the fluid pressure in the apply chamber 54 exceeds that in the release chamber 56, the friction surface 52 of clutch plate 50 is moved into engagement with the input shell 38, thereby engaging the TCC to provide a mechanical drive connection in parallel with the torque converter 24. In such case, there is no slippage between the impeller 36 and the turbine 40. When the fluid pressure in the release chamber 56 exceeds that in the apply chamber 54, the friction surface 52 of the clutch plate 50 is moved out of engagement with the input shell 38 as shown in FIG. 1a, thereby uncoupling such mechanical drive connection and permitting slippage between the impeller 36 and the turbine 40.

The turbine shaft 42 is connected as an input to the carrier Cf of a forward planetary gearset f. The sun Sf is connected to carrier Cf via the parallel combination of one-way clutch F5 and friction clutch OC. The clutch C5 is selectively engageable to ground the sun Sf. The ring Rf is connected as an input to the sun S1r of a compound rearward planetary gearset r via the parallel combination of one-way clutch F1 and friction clutch C3. The clutch C2 selectively connects the forward gearset ring Rf to rearward gearset ring Rr, and the Reverse clutch CR selectively grounds the ring Rr. The sun S2r is selectively grounded by clutch C4 or by clutch C1 through the one-way clutch F2. The pinion Pr mechanically couples the pinion gears and is connected as an output to shaft 20.

Figure 1C:
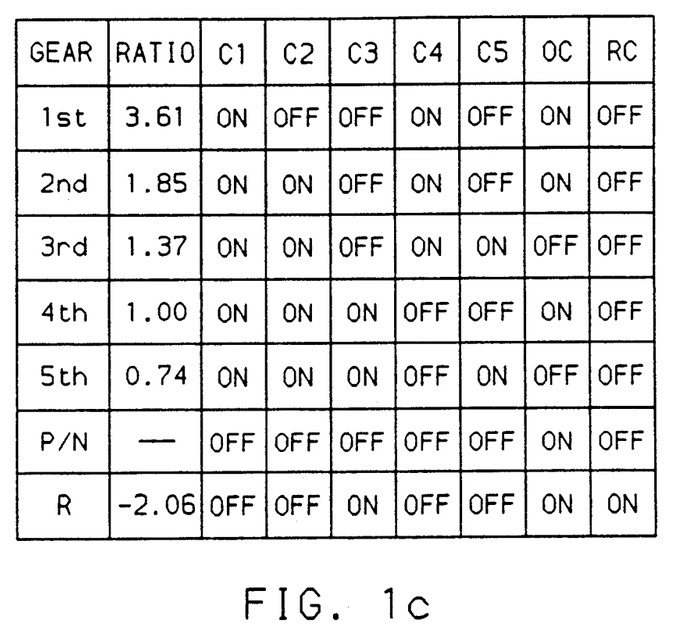
FIG. 1c is a state diagram for the clutches of the transmission depicted in FIGS. 1a-1b.

The various speed ratios and the clutch states required to establish them are set forth in the chart of FIG. 1c. Referring to that Figure, it is seen that the Park/Neutral condition is established by releasing all of the clutches. A garage shift to Reverse is effected by engaging the C3, OC and RC clutches. In the forward speed ranges, a garage shift to 1st is effected by engaging the clutches C1, C4 and OC. In this case, the forward gearset f is locked up and the one-way clutch F1 applies the turbine speed Nt as an input to the sun element Sr of rearward gearset r, providing a Ni/No ratio of 3.61.

As the vehicle speed increases, an upshift from 1st to 2nd is effected simply by engaging clutch C2; the one-way clutch F1 overruns as soon as on-coming clutch C2 develops sufficient torque capacity. The forward gearset f remains locked up, and the clutch C2 applies the turbine speed Nt as an input to the ring element Rr of rearward gearset r to provide a Ni/No ratio of 1.85. Downshifting from 2nd to 1st merely involves releasing clutch C2.

The upshift from 2nd to 3rd is effected by engaging clutch C5 and releasing clutch OC so that the forward gearset operates as an overdrive, thereby providing a Ni/No ratio of 1.37. Downshifting from 3rd to 2nd is effected by releasing clutch C5 and engaging clutch OC to return the forward gearset f to a lock-up condition.

The upshift from 3rd and 4th is effected by releasing clutch C5 and engaging clutch OC to return the forward gearset f to a lock-up condition, while releasing clutch C4 and engaging clutch C3 to lock-up the rearward gearset r, one-way clutch F2 releasing the rear planet axis Pr. In this case, the turbine speed Nt is transmitted directly to output shaft 20 for a Ni/No ratio of 1.00. The downshift 4th to 3rd is effected by releasing clutch OC and engaging clutch C5 to return the forward gearset f to an overdrive condition, while releasing clutch C3 and engaging clutch C4 to apply the turbine speed Nt as an input to the ring element Rr.

The timing of the 3-4 upshift and 4-3 downshift state changes must be properly coordinated to avoid conditions which would cause the ratio to change in the wrong direction or at the wrong rate. In the upshift, for example, care must be taken to ensure that on-coming clutch C3 is ready to lock-up the rearward gearset r when off-going clutch C5 is released to lock-up the forward gearset f. Otherwise, the Ni/No ratio initially increases from the 3rd ratio of 1.37 toward the 2nd ratio of 1.85. Conversely, in the 4-3 downshift, care must be taken to ensure that on-coming clutch C5 is ready to engage to establish an overdrive condition in the forward gearset f when off-going clutch C3 is released. Otherwise, the Ni/No ratio increases toward the 2nd ratio of 1.85 instead of the 3rd ratio of 1.37. The control of this invention, described below, uses ratio feedback information to properly sequence the clutch state changes for consistent high quality shifting.

Completing the shift analysis, the upshift from 4th to 5th is effected by engaging clutch C5 and releasing clutch OC to operate the forward gearset f in an underdrive condition, thereby providing a Ni/No ratio of 0.74. Downshifting from 4th to 3rd is effected by releasing clutch C5 and engaging clutch OC.

A positive displacement hydraulic pump 60 is mechanically driven by the engine output shaft 18. Pump 60 receives hydraulic fluid at low pressure from the fluid reservoir 64 and filter 65, and supplies line pressure fluid to the transmission control elements via output line 66. A pressure regulator valve (PRV) 68 is connected to the pump output line 66 and serves to regulate the line pressure by returning a controlled portion of the line pressure to reservoir 64 via the line 70. The PRV 68 is biased at one end by orificed line pressure in line 71 and at the other end by the combination of a spring force, a Reverse ratio fluid pressure in line 72 and a controlled bias pressure in line 74.

The Reverse fluid pressure is supplied by a Manual Valve 76, described below. The controlled bias pressure is supplied by a Line Pressure Bias Valve 78 which develops pressure in relation to the current supplied to electric force motor 80. Line pressure is supplied as an input to valve 78 via line 82, a pressure limiting valve 84 and filter 85. The limited line pressure, referred to as ACT FEED pressure, is also supplied as an input to other electrically operated actuators of the control system via line 86. With the above-described valving arrangement, it will be seen that the line pressure of the transmission is electrically regulated by force motor 80.

In addition to regulating line pressure, the PRV 68 develops a regulated converter feed (CF) pressure for the torque converter 24 in line 88. The CF pressure is supplied as an input to TCC Control Valve 90, which in turn directs the CF pressure to the release chamber 56 of torque converter 24 via line 92 when open converter operation is desired. In this case, the return fluid from torque converter 24 is exhausted via line 94, the TCC Control Valve 90, an oil cooler 96 and an orifice 98. When closed converter operation is desired, the TCC Control Valve 90 exhausts the release chamber 56 of torque converter 24 to an orificed exhaust 100, and supplies a regulated TCC apply pressure in line 102 to the apply chamber 54, thereby engaging the TCC. The TCC apply pressure in line 102 is developed from line pressure by a TCC Regulator Valve 104.

Both the TCC Control Valve 90 and the TCC Regulator Valve 104 are spring biased to effect the open converter condition, and in each case, the spring force is opposed by an electrically developed control pressure in line 106. The control pressure in line 106 is developed by the solenoid operated TCC Bias Valve 108, through a ratiometric regulation of the fluid pressure in line 110. When closed converter operation is desired, the solenoid of TCC Bias Valve 108 is pulse-width-modulated at a controlled duty cycle to ramp up the bias pressure in line 106. Bias pressures above the pressure required to shift the TCC Control Valve to the closed-converter state are used to control the TCC apply pressure developed in line 102 by TCC Regulator Valve 104. In this way, the TCC Bias Valve 108 is used to control the torque capacity of the TCC when closed converter operation is desired.

The friction clutches C1-C5, OC and CR are activated by conventional fluid operated pistons P1-P5, POC and PCR, respectively. The pistons in turn, are connected to a fluid supply system comprising the Manual Valve 76 referred to above, the Shift Valves 120, 122 and 124, and the Accumulators 126, 128 and 130.

The Manual Valve 76 develops supply pressures for Reverse (REV) and the various forward ranges (DR, D32) in response to driver positioning of the transmission range selector 77. The REV, DR and D32 pressures, in turn, are supplied via lines 72, 132 and 134 to the various Shift Valves 120-124 for application to the fluid operated pistons P1-P5, POC and PCR. The Shift Valves 120, 122 and 124 are each spring biased against controlled bias pressures, the controlled bias pressures being developed by the solenoid operated valves A, C and B. The accumulators 126, 128 and 130 are used to cushion the apply, and in some cases the release, of clutches C5, C2 and C3, respectively.

Figure 1D:
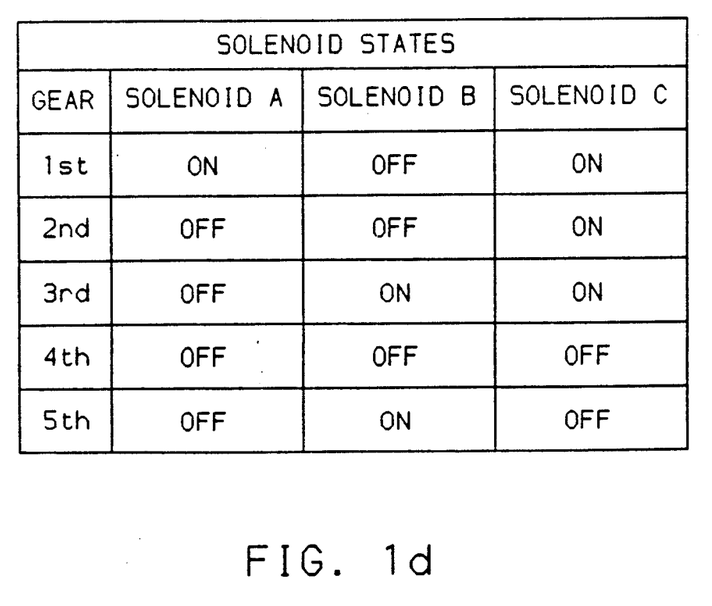
FIG. 1d is a chart depicting the electrical state changes required for shifting from one speed ratio to another.

A chart of the ON/OFF states of valves A, C and B for establishing the various transmission speed ratios is given in FIG. 1d. In Neutral and Park, the solenoids A, B and C are all off. In this condition, line pressure is supplied to clutch piston POC through orifice 176, but the remaining clutches are all disengaged. Reverse fluid pressure, when generated by Manual Valve 76 in response to driver displacement of range selector 77, is supplied directly to clutch piston P3 via lines 72, 73 and 140, and to clutch piston PCR via lines 72, 142, orifice 144 and Shift Valve 124.

A garage shift to the forward (Drive) ranges is effected when Manual Valve 76 is moved to the D position, connecting line pressure to the DR pressure supply line 132. The DR pressure is supplied to the clutch piston P1 via line 146 and orifice 148 to progressively engage clutch C1. At the same time, Solenoid Operated Valves A and C are energized to actuate Shift Valves 120 and 122. The Shift Valve 122 directs DR pressure in line 132 to clutch piston P4 via Regulator Valve 150 and line 152. The Shift Valve 120 supplies a bias pressure to the Regulator Valve 150 via line 154 to boost the C4 pressure. In this way, clutches C1, C4 and OC are engaged to establish 1st speed ratio.

Referring to the chart of FIG. 1d, a 1-2 upshift is effected by deenergizing Solenoid Operated Valve A to return Shift Valve 120 to its default state. This routes DR pressure in line 132 to the clutch piston P2 via Shift Valve 120, lines 156, 158 and 162, and orifice 160 to engage the clutch C2. Line 162 is also connected as an input to accumulator 128, the backside of which is maintained at a regulated pressure developed by valve 164. The engagement of clutch C2 is thereby cushioned as the C2 apply pressure, resisted by spring force, strokes the piston of accumulator 128. Of course, a 2-1 downshift is effected by energizing the Solenoid Operated Valve A.

Referring again to the chart of FIG. 1d, a 2-3 upshift is effected by energizing Solenoid Operated Valve B to actuate the Shift Valve 124. This exhausts the clutch piston POC via orifice 166 to release the clutch OC, and supplies line pressure in line 66 to clutch piston P5 via orifice 168 and line 170 to progressively engage clutch P5. Line 170 is connected via line 172 as an input to accumulator 126, the backside of which is maintained at a regulated pressure developed by valve 164. The engagement of clutch C5 is thereby cushioned as the C5 apply pressure, resisted by spring force, strokes the piston of accumulator 126. Of course, a 3-2 downshift is effected by deenergizing the Solenoid Operated Valve B.

Referring again to the chart of FIG. 1d, a 3-4 upshift is effected by deenergizing Solenoid Operated Valves B and C to return Shift Valves 124 and 122 to their default positions, as depicted in FIGS. 1a-1b. The Shift Valve 124 thereby (1) exhausts clutch piston P5 and accumulator 126 via line 170 and orifice 174 to release clutch C5, and (2) supplies pressure to clutch piston POC via lines 66 and 171 and orifice 176 to engage clutch OC. The Shift Valve 122 (1) exhausts clutch piston P4 via line 152 and orifice 178 to release clutch C4, and (2 supplies DR pressure in line 132 to clutch piston P3 via Shift Valve 120, orifice 180 and lines 182, 184, 73 and 140 to engage clutch C3. Line 182 is connected via line 186 as an input to accumulator 130, the backside of which is maintained at a regulated pressure developed by valve 164. The engagement of clutch C3 is thereby cushioned as the C3 apply pressure, resisted by spring force, strokes the piston of accumulator 130. Of course, a 4-3 downshift is effected by energizing the Solenoid Operated Valves B and C.

Referring again to the chart of FIG. 1d, a 4-5 upshift is effected by energizing Solenoid Operated Valve B to actuate the Shift Valve 124. This exhausts the clutch piston POC via orifice 166 to release the clutch OC, and supplies line pressure in line 66 to clutch piston P5 via orifice 168 and line 170 to progressively engage clutch P5. As indicated below, line 170 is also connected via line 172 as an input to accumulator 126, which cushions the engagement of clutch C5 as the C5 apply pressure, resisted by spring force, strokes the piston of accumulator 126. Of course, a 5-4 downshift is effected by deenergizing the Solenoid Operated Valve B.

The Solenoid Operated Valves A, B and C, the TCC Bias Valve 108 and the Line Pressure Bias Valve 78 are all controlled by a computer-based Transmission Control Unit (TCU) 190 via lines 192-196. As indicated above, the valves A, B and C require simple on/off controls, while the valves 108 and 78 are pulse-width-modulated (PWM). The control is carried out in response to a number of input signals, including an engine throttle signal %T on line 197, a turbine speed signal Nt on line 198 and an output speed signal No on line 199. The throttle signal is based on the position of engine throttle 16, as sensed by transducer T; the turbine speed signal is based on the speed of turbine shaft 42, as sensed by sensor 200; and the output speed signal is based on the speed of output shaft 20, as sensed by sensor 202. In carrying out the control, the TCU 190 executes a series of computer program instructions, represented by the flow diagrams of FIGS. 4, 5 and 6 described below.

Figure 2:
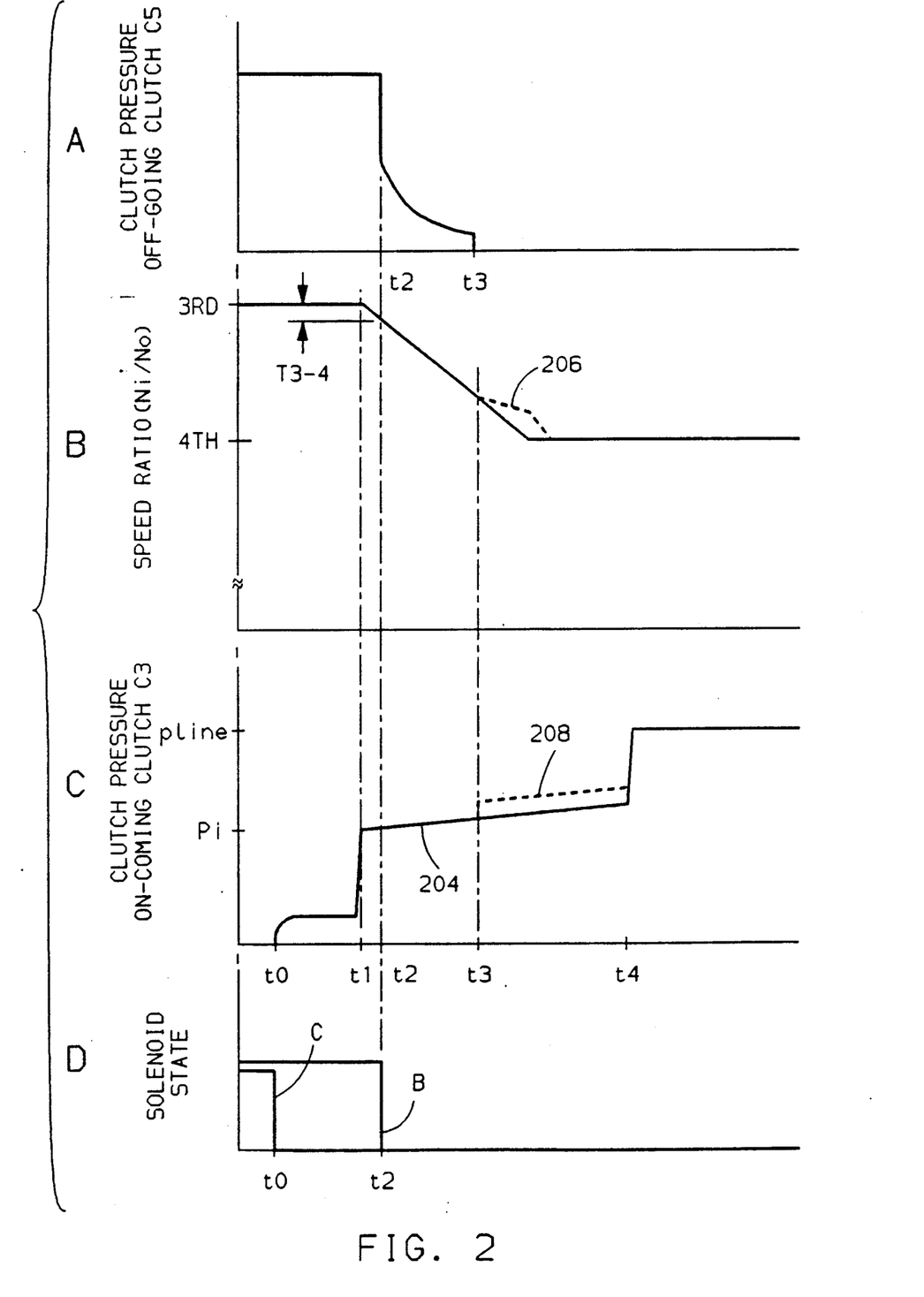
FIGS. 2 and 3 graphically depict double transition upshifting and downshifting, respectively, for the transmission depicted in FIGS. 1a-1b.
Figure 3:
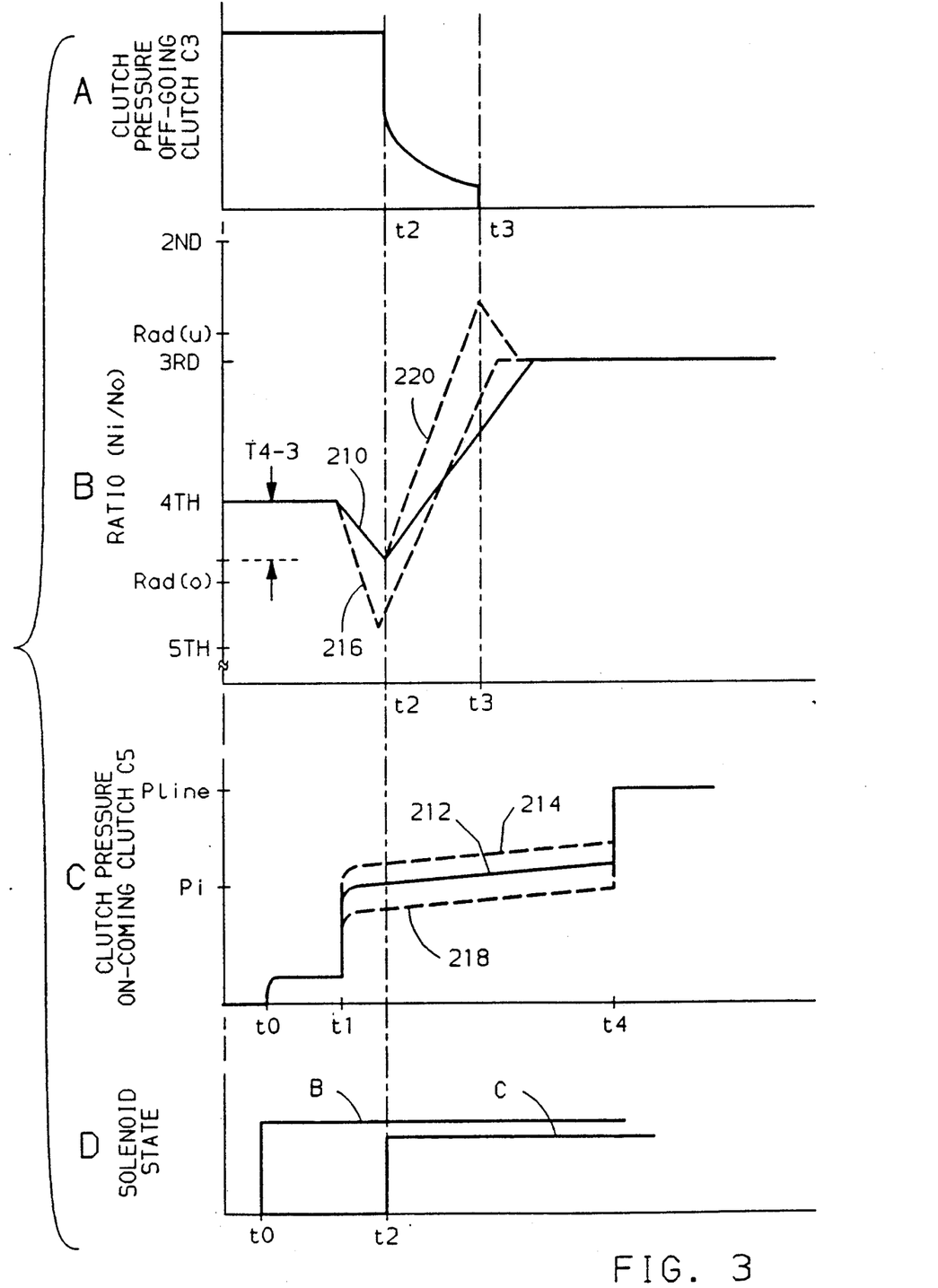

FIGS. 2 and 3 depict a 3-4 upshift and a 4-3 downshift, respectively, performed according to this invention. In the upshift of FIG. 2, Graph A depicts the pressure supplied to off-going clutch C5, Graph B depicts the ratio Ni/No, Graph C depicts the pressure supplied to on-coming clutch C3, and Graph D depicts the state of the Solenoid Operated Valves B and C. In the downshift of FIG. 3, Graph A depicts the pressure supplied to off-going clutch C3, Graph B depicts the ratio Ni/No, Graph C depicts the pressure supplied to on-coming clutch C5, and Graph D depicts the state of the Solenoid Operated Valves B and C.

Referring particularly to FIG. 2, and recalling the above discussion of FIGS. 1a-1d, the 3-4 upshift is effected by deenergizing the Solenoid Operated Valve B to release clutch C5 while engaging clutch OC (locking-up the forward gearset f), and deenergizing the Solenoid Operated Valve C to release clutch C4 while engaging clutch C3, providing a direct or 1:1 ratio. Thus, the forward gearset f is increasing in ratio (Ni/No) while the rearward gearset r is decreasing in ratio. This means that poor shift quality will result if the state change of the forward gearset f occurs before the state change of the rearward set. In practice, the critical elements are off-going clutch C5 and on-coming clutch C3. If off-going clutch C5 is released before on-coming clutch C3 has achieved adequate torque capacity, the Ni/No ratio will increase instead of decrease.

The above-mentioned timing concerns are addressed by sequencing the deenergization of Solenoid Operated Valves B and C in response to a measure of the speed ratio Ni/No. The upshift is initiated at time t0 by deenergizing the Solenoid Operated Valve C to initiate engagement of clutch C3 while releasing clutch C4. This in effect initiates a shift to the 5th ratio, as seen by the chart of FIG. 1c. On-coming clutch C3 is filled in the interval t0-t1, whereafter the engagement pressure immediately jumps to an initial pressure Pi to begin engagement of the friction elements of clutch C3.

The increased clutch engagement pressure provides a corresponding torque capacity, and the ratio Ni/No almost immediately begins to decrease, as seen in Graph B. The TCU 190 monitors the ratio, and initiates deenergization of the Solenoid Operated Valve B at time t2 when the ratio decrease exceeds a threshold T3-4. This serves to release off-going clutch C5 in the interval t2-t3, as seen in Graph A. Meanwhile, the C3 engagement pressure continues to increase along the solid trace 204 as the piston of accumulator 130 is linearly displaced. When the accumulator 130 is fully stroked at time t4, the clutch engagement pressure rises substantially to line pressure Pline, as seen in Graph C.

An additional uncertainty in the 3-4 upshift concerns the torque capacity of on-coming clutch C3 when off-going clutch C5 is fully released at time t3. If the on-coming clutch torque capacity is too low, increased slippage will occur at the release of off-going clutch C5. This condition is manifested as a reduction in the rate of change of ratio, as indicated by the broken trace 206 of Graph B. According to one aspect of this invention, the TCU 190 monitors the ratio Ni/No and reacts to the undercapacity condition by increasing the transmission line pressure Pline by a specified percentage of its normal value. This produces a corresponding and substantially immediate increase in the pressure applied to the backside of accumulator 130 via valve 164, which in turn, increases the on-coming clutch engagement pressure as indicated by the broken trace 208 in Graph C. The torque capacity of clutch C3 experiences a similar increase, and the shift is completed at the proper rate.

Referring particularly to FIG. 3, and recalling the above discussion of FIGS. 1a-1d, the 4-3 downshift is effected by (1) energizing the Solenoid Operated Valve C to engage clutch C4 while releasing clutch C3, and (2) energizing the Solenoid Operated Valve B to engage clutch C5 while releasing clutch OC. Here, the forward gearset f is decreasing in ratio (direct to overdrive) while the rearward gearset r is increasing in ratio (direct to underdrive). This means that poor shift quality will result if the state change of the forward gearset f occurs before the state change of the rearward gearset r. Again, the critical elements are on-coming clutch C5 and off-going clutch C3. If off-going clutch C3 is released before on-coming clutch C5 has achieved adequate torque capacity, a shift to the 2nd speed ratio will be initiated.

As in the upshift of FIG. 2, the control of this invention addresses the downshift timing concerns by sequencing the energization of Solenoid Operated Valves B and C in response to a measure of the speed ratio Ni/No. The upshift is initiated at time t0 by energizing the Solenoid Operated Valve B to initiate engagement of on-coming clutch C5 while releasing clutch OC. This in effect initiates a shift to the 5th ratio, as seen by the chart of FIG. 1c. On-coming clutch C5 is filled in the interval t0-t1, whereafter the engagement pressure immediately jumps to an initial pressure Pi to begin engagement of the friction elements of clutch C5.

The increased clutch engagement pressure provides a corresponding torque capacity, and the ratio Ni/No almost immediately begins to decrease, as indicated by the solid trace 210 in Graph B. The TCU 190 monitors the ratio, and initiates energization of the Solenoid Operated Valve C at time t2 when the ratio decrease exceeds a threshold T4-3. This serves to release off-going clutch C3 in the interval t2-t3, as seen in Graph A. Meanwhile, the C5 engagement pressure continues to increase along the solid trace 212 as the piston of accumulator 126 is linearly displaced. When the accumulator 126 is fully stroked at time t4, the clutch engagement pressure rises substantially to line pressure Pline, as seen in Graph C.

The above-described control ensures that the on-coming clutch C5 has started to engage before the off-going clutch C3 is released. However, the threshold T4-3 must be very small so that the initial decrease in ratio in the interval t1-t2 is not perceptible to the occupants of the vehicle. Accordingly, there is little information as to the magnitude of the on-coming torque capacity. If the on-coming torque capacity is too high, as indicated by the broken trace 214 in Graph C, the ratio will decrease at a relatively high rate, as indicated by the broken trace 216 in Graph B. If this occurs, the amount by which the ratio decreases prior to the release of off-going clutch C3 will significantly exceed the threshold T4-3, significantly degrading the shift quality. On the other hand, if the on-coming torque capacity is too low, as indicated by the broken trace 218 in Graph C, the ratio will increase at a relatively high rate, as indicated by the broken trace 220 in Graph B, exceeding the 3rd speed ratio of 1.37. This effect is manifested as engine flare, and also significantly degrades the shift quality.

According to this invention, the TCU 190 monitors the ratio Ni/No and reacts to the under or over capacity condition of the on-coming clutch by adaptively increasing the transmission line pressure Pline by a predetermined amount in the present and subsequent 4-3 downshifts. An overcapacity condition is indicated if the ratio falls below an overcapacity adaptive threshold Rad(o); in this case, the line pressure Pline is reduced by a predetermined amount, 43MOD. An undercapacity condition is indicated if the ratio exceeds an undercapacity adaptive threshold Rad(u); in this case, the line pressure Pline is increased by the amount 43MOD. As with the upshift, the increased or decreased line pressure results in a corresponding increase in the pressure applied to the backside of accumulator 126 via valve 164, which in turn, produces increased or decreased on-coming clutch engagement pressure. In subsequent 4-3 downshifts, the on-coming torque capacity will more closely approximate the ideal value, and shift quality will be improved.

Figure 4:
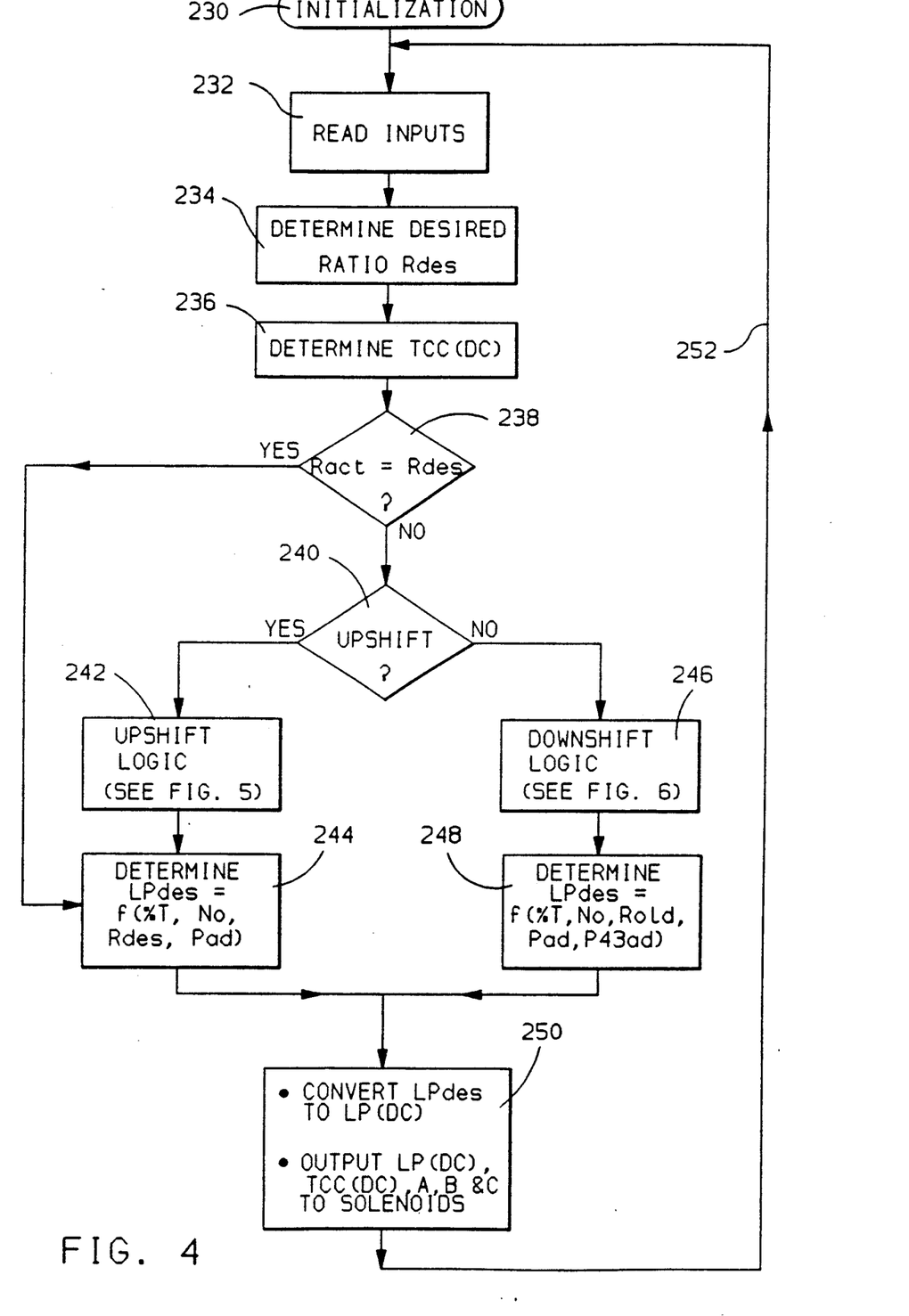
FIGS. 4, 5 and 6 depict flow diagrams representative of computer program instructions executed by the control unit of FIG. 1a in carrying out the shift control of this invention.
Figure 5:
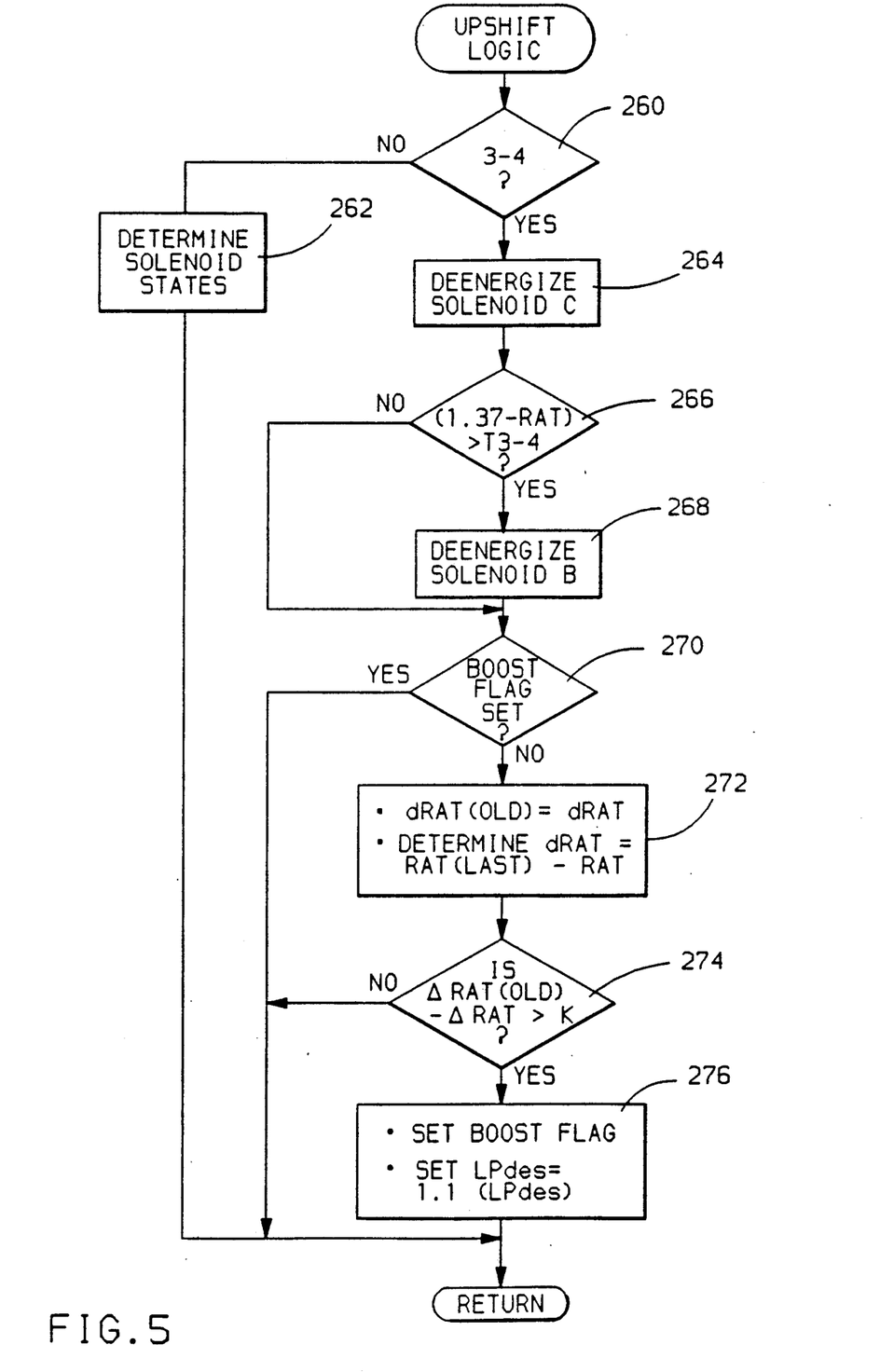

Referring now to FIGS. 4-5, the flow diagram of FIG. 4 represents a main or executive computer program which is periodically executed in the course of vehicle operation in carrying out the control of this invention. The block 230 designates a series of program instructions executed at the initiation of each period of vehicle operation for setting various terms and timer values to an initial condition. Thereafter, the blocks 232–238 are executed to read the various inputs referenced in FIG. 1a and to determine the desired speed ratio Rdes and the torque converter clutch duty cycle TCC(DC). The desired ratio Rdes may be determined in a conventional manner as a predefined function of engine throttle position %T and output speed No. The torque converter clutch duty cycle TCC(DC) may be determined as a function of the throttle position, output speed No and the difference between input and output speeds Ni and No.

If the actual ratio Ract—that is, Ni/No—is equal to the desired ratio Rdes, as determined at block 238, the block 244 is executed to determine the desired line pressure LPdes. In this case, the desired line pressure LPdes is determined as a function of throttle position and output speed, and also is adjusted based on the desired ratio Rdes and an adaptive correction term Pad. The adaptive correction term Pad may be generated during upshifting, based on shift time, as set forth in the U.S. Pat. to Vukovich et al 4,283,970, issued Aug. 18, 1981, and assigned to the assignee of this invention.

If an upshift is required, as determined by blocks 238 and 240, the blocks 242 and 244 are executed to perform the Upshift Logic of FIG. 5 in addition to determining the desired line pressure LPdes, as described above. If a downshift is required, as determined by blocks 238 and 240, the blocks 246 and 248 are executed to perform the Downshift Logic of FIG. 6 and to determine the desired line pressure LPdes. Here, the desired line pressure is determined as a function of throttle position and output speed, but is adjusted based on the pre-shift, or old ratio Rold, the adaptive correction term Pad, and a further adaptive correction term P43ad if the shift is a 4—3 downshift. In any case, the block 250 is then executed to convert the desired line pressure LPdes to a solenoid duty cycle LP(DC) and to output the various duty cycles and discrete solenoid states to the solenoid operated valves described above in reference to FIGS. 1a–1b.

Referring now to the Upshift Logic of FIG. 5, the decision block 260 is first executed to determine if the shift is a 3-4 upshift; that is, a double transition upshift. If not, the solenoid states A, B and C are simply set in accordance with the chart of FIG. 1d, completing the routine, as indicated by the block 262. If the shift is a 3-4 upshift, the block 264 is immediately executed to deenergize solenoid C. This initiates the filling of on-coming clutch C3, as described above in reference to FIG. 2. Once the consequent decrease in ratio Ni/No exceeds the threshold T3-4, as determined at block 266, the block 268 is executed to deenergize solenoid B, initiating the release of the off-going clutch C5.

Decision block 270 then determines if the BOOST flag is set; initially, it is cleared by the initialization block 230. If not set, the blocks 272–276 are executed to boost the desired line pressure LPdes upon detection of a predefined reduction in the rate of change of speed ratio. The block 272 stores the current value of the change in ratio, dRAT, in the term dRAT(OLD), and determines the new change of ratio dRAT according to the difference [RAT(LAST)−RAT], where RAT is the current measure of the speed ratio Ni/No and RAT(LAST) is the previous measure of the speed ratio. The block 274 then determines if the rate of change in ratio, that is [dRAT(OLD)−dRAT], exceeds the reference value K. This corresponds to a change in the slope of the trace depicted in Graph B of FIG. 2, as described above. If the condition is met, on-coming clutch C3 does not have sufficient torque capacity, and the block 276 is executed to set the BOOST flag and to increase the desired line pressure LPdes by a specified amount such as 10% of its normal value. This corresponds to the broken trace 208 in Graph C of FIG. 2.

Figure 6:
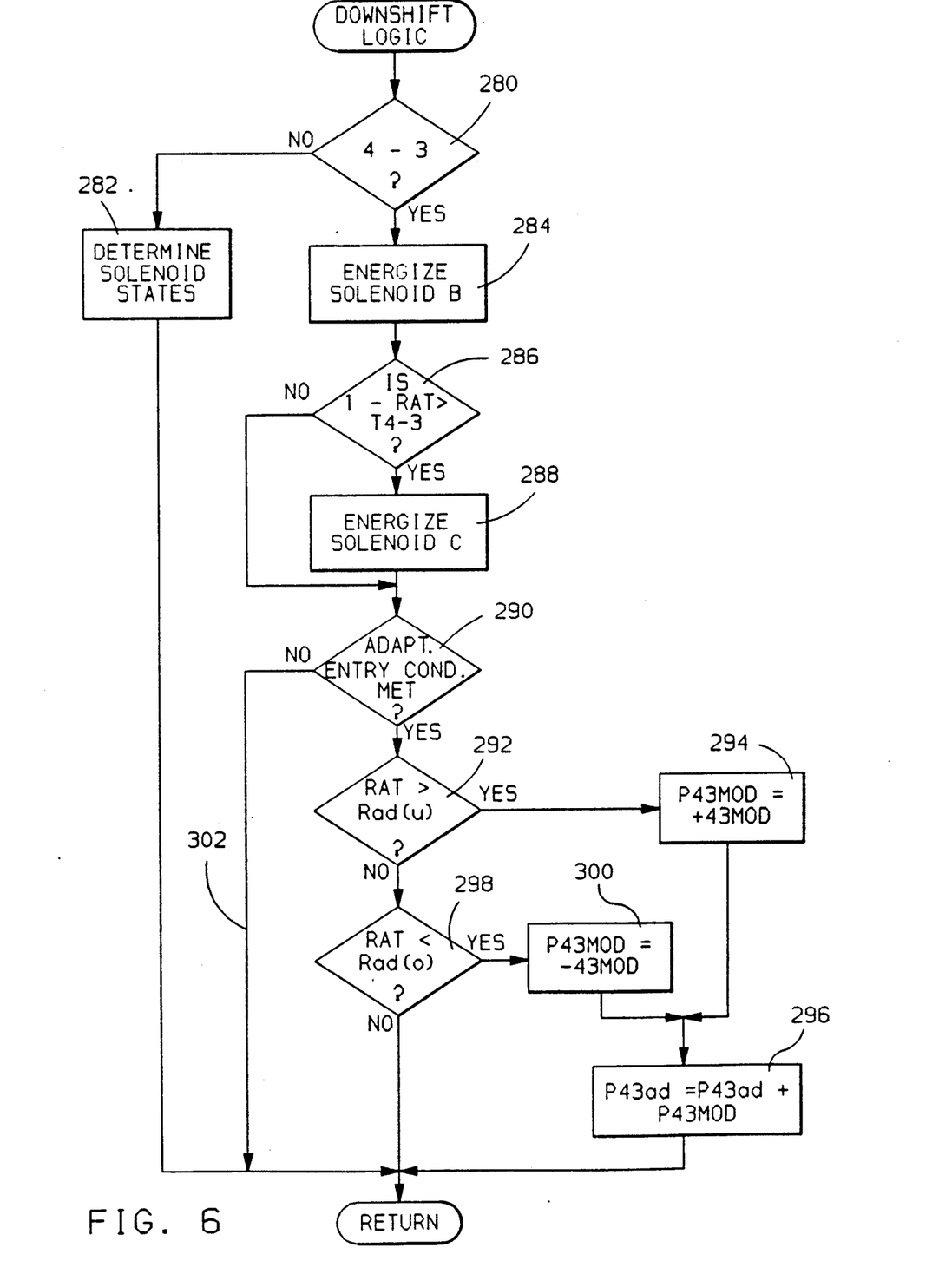

Referring now to the Downshift Logic of FIG. 6, the decision block 260 is first executed to determine if the shift is a 4–3 downshift; that is, a double transition downshift. If not, the solenoid states A, B and C are simply set in accordance with the chart of FIG. 1d, completing the routine, as indicated by the block 282. If the shift is a 4–3 downshift, the block 284 is immediately executed to energize solenoid B. This initiates the filling of on-coming clutch C5, as described above in reference to FIG. 3. Once the consequent decrease in ratio (1.00-RAT) exceeds the threshold T4-3, as determined at block 286, the block 288 is executed to energize solenoid C, initiating the release of off-going clutch C3.

The block 290 is then executed to determine if the entry conditions for adaptive adjustment of the transmission line pressure are satisfied. The entry conditions ensure that adaptive pressure corrections are only made if the shift is a normal 4-3 downshift. For example, the transmission oil temperature must be within a normal operating range, the engine throttle position must not change by more than a certain amount during the shift, and an adaptive correction must not have already been made based on the current downshift. Assuming the entry conditions are met, the block 292 is executed to determine if the speed ratio RAT is greater than the undercapacity adaptive ratio threshold Rad(u). If so, the torque capacity of on-coming clutch C5 is too low, and the block 294 is executed to set the adaptive pressure modifier term P43MOD to +K. As indicated at block 296, the adaptive pressure modifier term P43MOD is then added to the cumulative 4–3 adaptive term P43ad, which in turn, is factored into the desired line pressure term LPdes at block 248 of FIG. 4.

If block 292 is answered in the negative, the block 298 is executed to determine if the speed ratio RAT is less than the overcapacity adaptive ratio threshold Rad(o). If so, the torque capacity of on-coming clutch C5 is too high, and the block 300 is executed to set the adaptive pressure modifier term P43MOD to −K. As indicated above, the block 296 then adds the adaptive pressure modifier term P43MOD to the cumulative 4-3 adaptive term P43ad. In either event, the adaptive pressure correction will have little effect in the current shift. In subsequent 4-3 downshifts, however, the line pressure will be incrementally modified so that the observed change in ratio will more nearly approximate the solid trace of Graph B, FIG. 3. If the entry conditions are not met, or once an adaptive pressure correction has been made as described above, the block 290 will be answered in the negative, and execution of the blocks 292–300 will be skipped as indicated by flow diagram line 302.

While this invention has been described in reference to the illustrated embodiment, it is expected that various modifications will occur to those skilled in the art. In this regard, it should be realized that controls incorporating such modifications may fall within the scope of this invention, which is defined by the appended claims.

The embodiments of the invention in which an exclusive property or privilege is claimed are defined as follows:

1. In an automatic transmission including input and output shafts coupled through first and second interconnected gearsets, each gearset being adapted to provide multiple speed ratios, and various selectively engageable torque transmitting devices adapted to change speed ratios provided by said first and second gearsets to thereby establish multiple overall speed ratios between said input and output shafts, a downshift from a second speed ratio to a first speed ratio being carried out by releasing an off-going torque transmitting device to increase the speed ratio provided by said first gearset while applying an on-coming torque transmitting device to decrease the speed ratio provided by said second gearset, thereby achieving an increase in the overall speed ratio between said input and output shafts, a method of operation for coordinating such release and apply, comprising the steps of:

initiating the apply of said on-coming torque transmitting device at a predefined rate to effect an initial decrease in said overall speed ratio;

releasing said off-going torque transmitting device when a specified decrease in the overall speed ratio is detected to thereby achieve the increase in said overall speed ratio;

detecting a condition of improper torque capacity of said on-coming torque transmitting device based on improper excursions of said overall speed ratio during such apply and release; and adjusting the rate of apply of said on-coming torque transmitting device in subsequent downshifting in response to such detection to thereby avoid said condition of improper capacity during such subsequent downshifts.

2. The method set forth in claim 1, wherein the step of detecting a condition of improper torque capacity of said on-coming torque transmitting device includes the steps of:

periodically computing the decrease in overall speed ratio occasioned by the apply of said on-coming torque transmitting device; and detecting a condition of excessive torque capacity of said on-coming torque transmitting device when the computed decrease exceeds a reference greater than said specified decrease.

3. The method set forth in claim 2, wherein the on-coming torque transmitting device develops torque capacity in relation to a fluid pressure supplied thereto, and the step of adjusting the rate of apply of said on-coming torque transmitting device is carried out by increasing the fluid pressure supplied to such on-coming torque transmitting device in subsequent downshifts from said second speed ratio to said first speed ratio.

4. The method set forth in claim 1, wherein the step of detecting a condition of improper torque capacity of said on-coming torque transmitting device includes the steps of:

periodically measuring the overall speed ratio following the release of said off-going torque transmitting device; and detecting a condition of insufficient torque capacity of said on-coming torque transmitting device if the measured ratio reaches a reference ratio substantially in excess of said first speed ratio.

5. The method set forth in claim 4, wherein the on-coming torque transmitting device develops torque capacity in relation to a fluid pressure supplied thereto, and the step of adjusting the rate of apply of said on-coming torque transmitting device is carried out by decreasing the fluid pressure supplied to such on-coming torque transmitting device in subsequent downshifts from said second speed ratio to said first speed ratio.

* * * * *